United States Patent [19]

Eckle et al.

[11] Patent Number: 4,617,848
[45] Date of Patent: Oct. 21, 1986

[54] TURRET HEAD FOR A LATHE AND A TOOL HOLDER SUITABLE FOR USE THEREWITH

[75] Inventors: Otto Eckle, Loechgau; Helmut Veigel, Schwieberdingen, both of Fed. Rep. of Germany

[73] Assignee: Komet Stahlhalter- und Werkzeugfabrik Robert Bruning, GmbH, Besigheim, Fed. Rep. of Germany

[21] Appl. No.: 767,461

[22] Filed: Aug. 20, 1985

[30] Foreign Application Priority Data

Sep. 18, 1984 [DE] Fed. Rep. of Germany ... 8427440[U]

[51] Int. Cl.$^4$ ............................................. B23B 29/24
[52] U.S. Cl. .................................. 82/36 A; 82/36 R; 408/239 R
[58] Field of Search .................. 82/36 R, 36 A, 36 B; 279/83; 408/238, 239 R, 239 A, 240

[56] References Cited

U.S. PATENT DOCUMENTS

| | | | |
|---|---|---|---|
| 3,375,742 | 4/1968 | Sturm | 82/36 A |
| 3,380,326 | 4/1968 | Waddy | 82/36 R |
| 4,018,112 | 4/1977 | Heaton | 82/36 A |
| 4,486,131 | 12/1984 | Eckle | 82/36 A |

FOREIGN PATENT DOCUMENTS 3108439 11/1982 Fed. Rep. of Germany ..... 82/36 A
2094191 6/1985 United Kingdom .

Primary Examiner—Francis S. Husar
Assistant Examiner—Verry Kearns
Attorney, Agent, or Firm—Flynn, Thiel Boutell & Tanis

[57] ABSTRACT

The rotary disk for a lathe has near the circumference thereof a plurality of insert-receiving recesses (5) which are circumferentially spaced apart. For each insert-receiving recess (5) there is provided an insert disk (6) which can be removably inserted therein and within which a receiving bore is concentrically arranged. Each insert disk (6) has in the region of the cylindrical receiving bore (8) two diametrically opposite, radially extending screw-threaded bores (9, 10), a clamping screw (11) with a conical recess (12) being screwed into the screw-threaded bore (9) which is located more inwardly with respect to the axis of the rotary disk and a clamping screw (13) with a conical end part (14) being screwed into the screw-threaded bore (10) which is located more outwardly with respect to the said axis. Each tool holder shank (17) which can be inserted into the receiving bore (8) has a transverse bore (18) with a clamping bolt (19) arranged for radial sliding movement therein and is provided at one of its ends with a conical end part (20) and at its other end with a conical recess (21).

7 Claims, 3 Drawing Figures

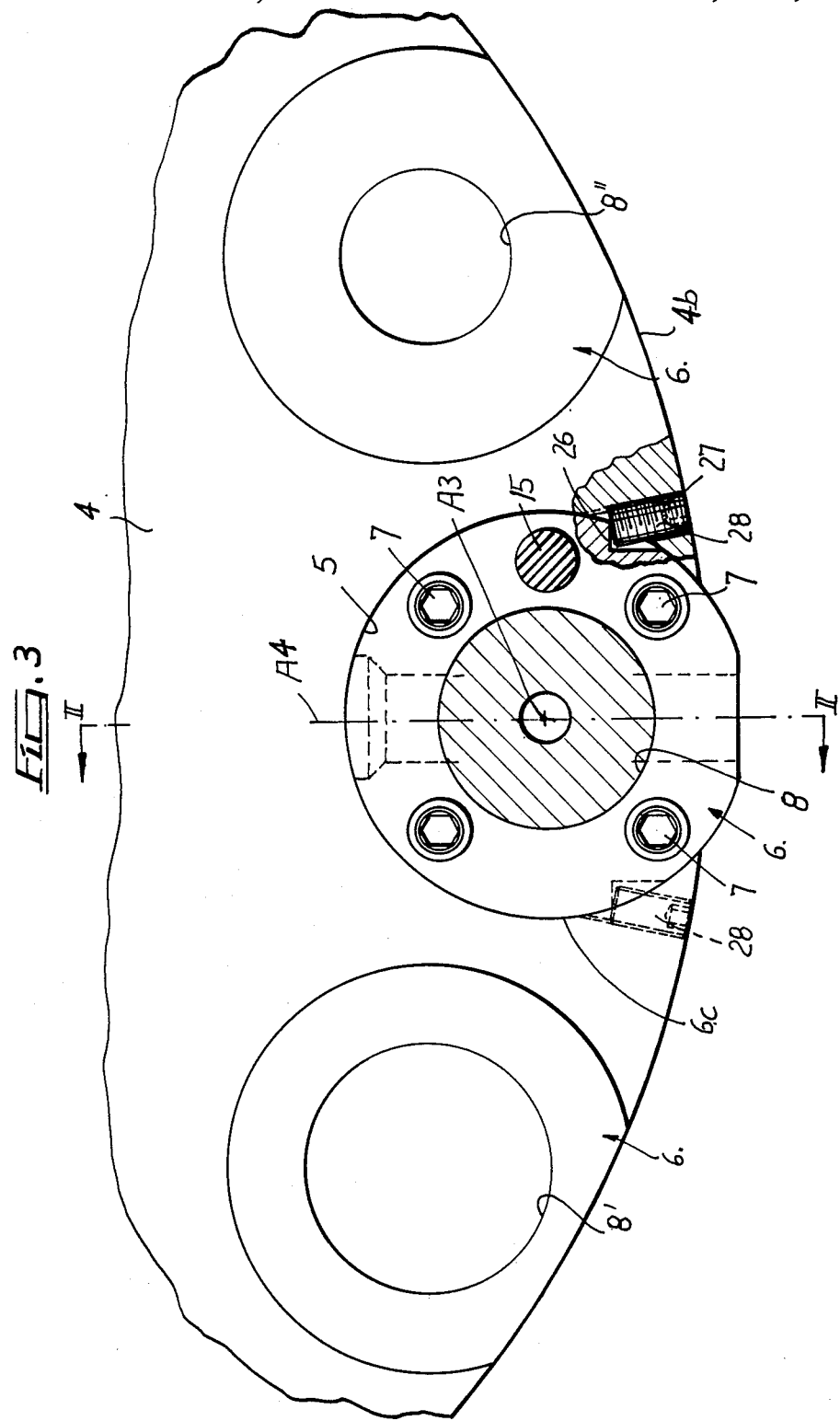

TURRET HEAD FOR A LATHE AND A TOOL HOLDER SUITABLE FOR USE THEREWITH

FIELD OF THE INVENTION

The invention relates to a turret head for a lathe and a tool holder suitable for use therewith including a substantially cylindrical rotary disk which is rotatable about its axis and has a plurality of tool holder shank-receiving bores formed close to its periphery, these shank-receiving bores being circumferentially spaced apart and extending parallel to the axis of the rotary disk, and each of them being surrounded by an end surface disposed at right angles to the axis of the rotary disk and having an associated clamping element which extends into it and is movable radially with respect to the axis of the rotary disk, and also including tool holders each having a cylindrical shank which fits accurately in the shank-receiving bore, a concentric annular surface of the tool holder surrounding each shank and extending at right angles to the axis of the same, and clamping means on the shank cooperating with the clamping element in such a manner that the annular surface of the tool holder can be pressed against the end surface surrounding the corresponding shank-receiving bore when the clamping element is moved radially.

BACKGROUND OF THE INVENTION

In numerically controlled lathes such a turret head serves for the reception of a plurality of preset tools which project beyond the front end surface of the cylindrical rotary disk. The axis of rotation of the rotary disk is usually disposed horizontally and parallel to the axis of the workpiece spindle. A plurality of rotary disks are provided which are also interchangeable.

In order to enable the preset tools to be easily interchanged on the rotary disk, a "cylindrical shank tool system" (VDI-Richtlinien, VDI 3425, page 2, Nov. 1972) has been developed. In this system, the tool holder provided for receiving each tool has a cylindrical shank which is formed on one side with a flat surface and with a set of teeth extending transversely to the axis of the shank. The cylindrical shank can be inserted in the respective shank-receiving bore of the rotary disk. Moreover, there is arranged for sliding movement in the rotary disk a clamping element which by means of a set of teeth provided thereon meshes with the set of teeth on the shank. By means of this clamping element the toolholder will be pressed radially so that its shank enters the respective bore and its annular surface engages the end surface of the rotary disk. Although the shank and the receiving bore interengage as a close fit, a slight amount of play must always be present between the shank and the shank-receiving bore in order to enable the shank to be slid into the shank-receiving bore without the use of undue force. By means of the clamping element a force is exerted which is directed transversely to the axis of the shank and acts unilaterally against it. The shank is thus pressed against that side of the shank-receiving bore which is remote from the clamping element. The result of this is that, when the tool holder is clamped tight, the axis of its shank is offset eccentrically and parallel with respect to the axis of the shank-receiving bore. The accuracy of the assembly operation and the accuracy with which it can be repeated and hence also the accuracy of manufacture are thus negatively influenced. Moreover, the pressure of the shank against part of the wall of the shank-receiving bore results in substantial frictional force being exerted between the two parts and between the two sets of teeth that are in mesh with each other. This substantial frictional force prevents axial displacement of the shank in the shank-receiving bore, so that the annular surface of the toolholder is not pressed with sufficient force or often not in fact pressed at all against the end surface of the rotary disk. The transverse forces acting on the tool are then insufficiently transmitted or no longer transmitted at all from the annular surface to the end surface of the rotary disk and the transmission of force takes place only through the relatively small diameter shank. In addition, the torque must be transmitted solely from the clamping element to the shank, which can lead to deformation of the two sets of teeth. A further disadvantage of this known connection between the tool holder and the rotary disk consists in the fact that the shank-receiving bores in the rotary disk are all made of equal size. If toolholders having a smaller or larger shank diameter need to be connected to the rotary disk, this is only possible with the interposition of adaptors. The interposition of adapters, however, increases the extent of projection of the tool, i.e. the tool is located at a greater distance from the end surface of the rotary disk. This means that there is not only a loss of stability, but also inter alia that there are obstacles in the working space and movement restrictions. Furthermore, it may happen that the connection between the tool holder and the rotary disk will be damaged as a result of some kind of unforeseeable overload. In this case, the entire rotary disk must then usually be replaced by a new one. Moreover, in the known "cylindrical shank tool system", the shank and hence also the shank-receiving bore must have a relatively great length, which is more than one and a half times as great as the diameter of the shank. Thus, an increased consumption of material results during the manufacture of the tool holder and the weight of the latter is also increased. The relatively great length of the shank can moreover be disadvantageous in relation to an automatic interchange of the tool holders.

The invention has for its basic object to improve a turret head for a lathe and a tool holder suitable for use therewith, which are of the kind initially referred to, as follows, i.e. so that, when the tool holder is clamped tightly to the rotary disk, no radial displacement of the axes of the toolholder and the receiving bore will take place and the annular surface will be pressed with a considerable prestressing force against the end surface of the rotary disk which is fixed for rotation with the spindle, in order thereby on the one hand to improve the accuracy of the assembly and of the mechanical functioning of the apparatus and on the other hand to ensure that a maximum proportion of the torque will be transmitted by frictional contact from the rotary disk to the annular surface, and furthermore to provide a connection between the tool holder and the rotary disk which is resistant to bending and non-oscillating and the component parts of which can easily be replaced in the event of their being damaged. In addition, it must be possible, if necessary, to connect tools to the rotary disk so that they project the least possible distance from the latter.

This is achieved according to the invention in that the rotary disk has a cylindrical insert-receiving recess disposed concentrically with each shank-receiving bore, that for each insert-receiving recess there is provided an insert disk which is removably insertable therein and concentrically within which is located the respective shank-receiving bore, that each insert disk has, in the region of the cylindrical shank-receiving bore, two diametrically opposite, radially extending screw-threaded bores, an inner clamping screw with a conical recess being screwed into one of the screw-threaded bores which is located more inwardly in relation to the axis of the rotary disk and an outer clamping screw with a conical end part being screwed into the other screw-threaded bore which is located more outwardly in relation to the said axis, that the shank of each tool holder has a transverse bore with a clamping bolt srranged for radial sliding movement therein and provided at one of its ends with a conical end part which cooperates with the conical recess in the inner clamping screw and is provided at its other end with a conical recess which is arranged to cooperate with the conical end part of the outer clamping screw and that the distance of the axis of the screw-threaded bores from the end surface of the insert disk is somewhat greater than the distance of the axis of the transverse bore from the annular surface, so that, when the outer clamping screw is tightened, it acts against the clamping bolt in a direction to cause pressure of the annular surface and the end surface of the insert disk against each other.

The invention also originates from the concept of not allowing the shank of the tool holder to engage directly in the rotary disk, but arranging instead for it to engage in the shank-receiving bore in an insert disk which is itself let into the rotary disk and loosely connected therewith. Between the shank and the shank-receiving bore further special clamping elements are provided which are known per se in connection with a boring tool (DE-PS No. 31 08 439).

As a result of the insert disk being let into a corresponding insert-receiving recess in the rotary disk a connection is obtained between the tool holder and the rotary disk which is structurally very short and hence to a considerable extent vibrationless. The insert disks themselves as well as the shank-receiving bores provided therein, can be produced with greater accuracy, so that an improvement in the accuracy of manufacture is obtained. As a result of the separate manufacture of the insert disks, the formation of the clamped connection between the shank of the tool holder and the rotary disk is also simplified. In particular, if any of the parts of the connecting and clamping elements are damaged, these parts can easily be replaced and there is no need for the entire rotary disk to be replaced. By changing insert disks for others having greater or smaller diameter shank-receiving bores, it is also possible to insert tool holders with a larger or smaller shank diameter directly into the insert disks without the interposition of adapters. By the use of the connecting device disclosed in the above mentioned DE-PS No. 31 08 439, which in that specification serves only for connecting pats of tools to one another, further additional advantages are obtained. Compared with the conventional connection initially referred to between toolholder and rotary disk, an extraordinarily stable and accurate connection is provided between these two parts. The use of a radially displaceable clamping bolt prevents the shank from being urged radially towards one side in the shank-receiving bore when the outer clamping screw is tightened. Since no radial forces act on the shank, no displacement of the axis of the shank occurs with respect to the axis of the shank-receiving bore, so that both of these axes are always in precise axial alignment. A high degree of accuracy of assembly and reproduction is also ensured. Due to the elimination of lateral pressure of the shank against the wall of the shank-receiving bore, it is further ensured that the forces exerted by the clamping screws will be transmitted via the clamping bolt to the shank. The clamping force of the radially outer clamping screw produces in the radially inner clamping screw an equal but oppositely acting reaction force, whereby the clamping force of the outer clamping screw is doubled. Due to the conical end parts and recesses, the radially acting clamping forces of the clamping screws produce axially acting forces. As a result of the axial offsetting of the common axis of the clamping screws and the clamping bolt, the latter is also displaced axially by the axially acting force components and consequently presses the annular surface with an increased loading force against the end surface of the rotary disk. Due to the intense and uniform pressure of the said annular surface against the said end surface, a greater proportion of the torque is transmitted, via these surfaces by frictional engagement. The rest of the torque is transmitted through the clamping screws and the clamping bolt. It is furthermore important that, when there is good contact between the said annular surface and the said end surface, the forces which act transversely on the tool will be transmitted over a relatively large diameter from these two surfaces. Consequently, the accuracy of manufacture is increased and the danger of vibration of the tool is reduced. In addition, higher cutting capacities and hence shorter working times are obtained.

BRIEF DESCRIPTION OF THE DRAWINGS

The invention is explained in greater detail below with reference to an embodiment shown in the drawings.

FIG. 3 is a radial section taken on the line III—III in FIG. 2.

DETAILED DESCRIPTION

Figure 1:
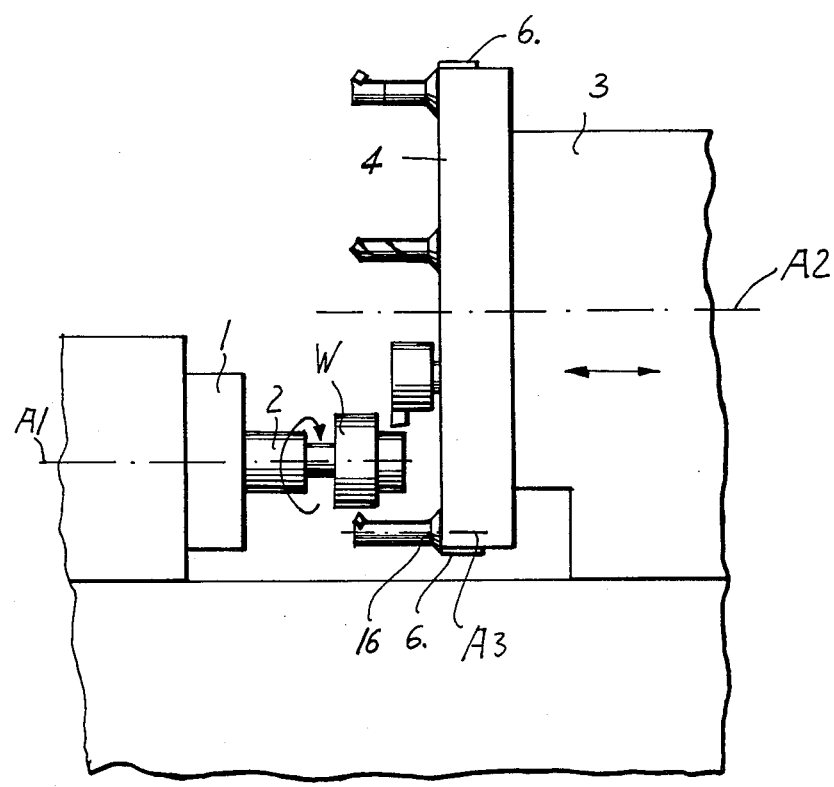
FIG. 1 is a schematic side elevation of a numerically controlled lathe with a turret head.

The rotatable workpiece spindle 1 has a chuck 2 or the like for clamping and holding a workpiece W. The turret head 3 carries a rotary disk 4 which is rotatable about an axis A2 parallel to the axis A1 of the tool spindle and can be fixed in predetermined angular positions. The turret head 3 is moreover displaceable in the direction of the axis A2.

The rotary disk 4 has near its circumference 4a a plurality of cylindrical insert-receiving recesses 5. In each of the cylindrical recesses 5, there is located a cylindrical insert disk 6 which is arranged so that it is inset to a substantial extent in the rotary disk 4 and its outwardly facing end surface 6a projects only to a very small extent, namely about 1 mm, beyond the end surface 4a of the rotary disk 4.

Each of the insert disks 6 lies with its rear surface 6b in contact with a flat base 5a of the recess 5, which flat base is located in a plane disposed radially with respect to the axis A2 of the rotary disk 4. Each of the insert disks 6 is removably connected to the rotary disk 4 by means of a plurality of fixing screws 7 which extend through the insert disk 6 and are screwed into screw-threaded bores (not shown) provided in the base 5a.

A tool holder shank-receiving bore 8 is formed in each of the insert disks 6 concentrically with the outer surface 6a thereof. Each insert disk 6 furthermore has, in the region of the cylindrical receiving bore 8, two diametrically opposite, radially extending, screw-threaded bores 9, 10. These screw-threaded bores 9, 10 extend radially both with respect to the axis A3 of the receiving bore 8 and also with respect to the axis A2 of the rotary disk 4. An inner clamping screw 11 is screwed into the screw-threaded bore 9 which is located more inwardly in relation to the axis A2 of the rotary disk 4, this clamping screw 11 being formed with a conical recess 12. An outer clamping screw 13 with a conical end part 14 is screwed into the radially outer screw-threaded bore 10. In addition, a further fixing screw 15, which is provided in the insert disk 6 and projects beyond the end surface 6a thereof, engages in a retaining bore in the tool holder 16.

The tool holder 16 has a cylindrical shank 17 which is insertable as a very close fit in the shank-receiving bore 8. The shank 17 has a transverse bore 18 in which a clamping bolt 19 is radially slidable. This clamping bolt 19 is provided at one end with a conical end part 20 and at its other end with a conical recess 21. The clamping bolt 19 cooperates with the two clamping screws 11 and 13 via this conical end part 20 and the recess 21. The shank 17 of the tool holder 16 is moreover surrounded by a concentric annular surface 22. The distance a1 of the axis A4 of the screw-threaded bores 9, 10 from the end surface 6a is somewhat greater than the distance a2 of the axis A5 of the transverse bore 18 from the annular surface 22.

The tool holder 16 may be formed in any desired manner at its front free end remote from its shank to receive a very wide variety of tools, for example a boring head. a turning chisel or even a cutter head. If desired, the tool holder may also be made in one piece with the cutter head. In addition, the tool holder 16 may be provided with a coolant supply channel 23. This channel 23 may be supplied with coolant via a radial coolant supply bore 24 in the rotary disk 4. It is also possible for air to be supplied to the tool holder through a further radial bore 25.

Figure 2:
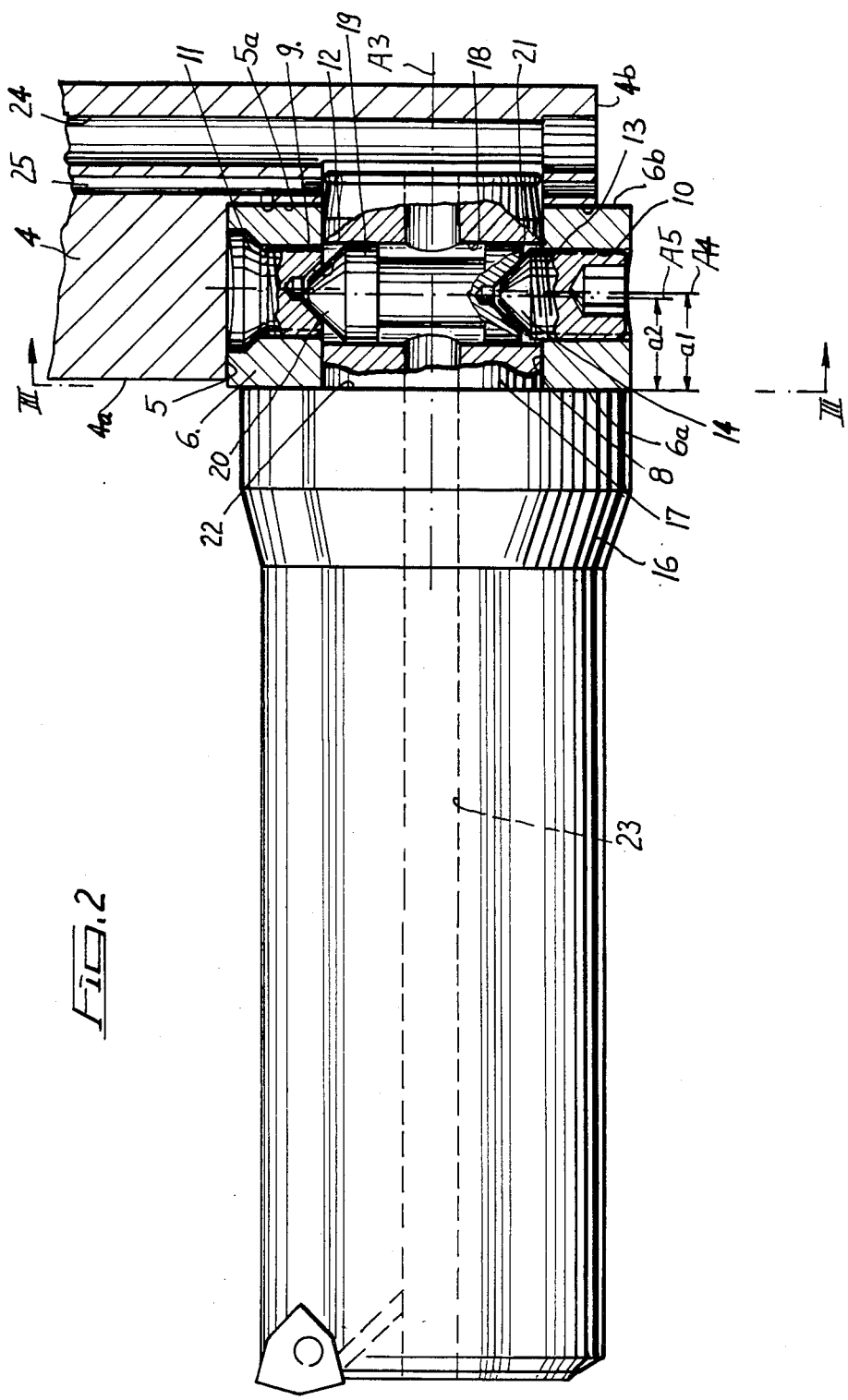
FIG. 2 is an axial section on the circumference of the rotary disk, taken on the line II—II in FIG. 3.

Normally the insert disks 6 remain connected to the rotary disk 4. Only the tool holder with the tool previously mounted therein is interchnged. In order to change a tool, only the outer clamping screw 13 need be unscrewed so far that its conical end part 14 no longer projects into the shank-receiving bore 8. In order to operate the clamping screw 13, a motor-driven screwdriver may, if desired be provided. Once the outer clamping screw 13 has been unscrewed, the clamping bolt 19 can be slid so far in the transverse bore 18 that its conical end part 20 is withdrawn form the conical cavity 12 in the inner clamping screw 11. The tool holder 16 can then be removed leftward from rotary disk 4 together with the tool. After another tool holder has been inserted, the outer clamping screw 13 is screwed radially inwardly so that its conical end part 14 comes into contact with the conical recess 21 in the clamping bolt 19 and by means of its conical end part 20 presses into the conical recess 12 in the inner clamping screw 11. The radially acting clamping force of the outer clamping screw 13 exerts on the inner clamping screw 11 a reaction force which is equal to this clamping force but acts in the opposite direction. Due to the axial offsetting of the axes A4 and A5, each of the two clamping screws 11, 13 exerts an equally large axially directed component of force through the conical end parts 14, 20 and the conical recesses 12, 21. Consequently, the clamping force of the outer clamping screw 13, with a conical angle of 90°, exerts twice the clamping force and presses against the annular surface 22 of the toolholder with a force which is twice as great as the clamping force of the clamping screw 13. Since the clamping screws 11, 13 act diametrically oppositely against the clamping bolt 19, the compressive force exterted between the surfaces 6a and 22 is uniform over the entire circumference. Since, furthermore the clamping bolt 19 is slidable in the transverse bore 18, no unilaterally acting force is exerted on the shank 17. Consequently, the axis of the tool holder 16 is exactly aligned with the axis A3 of the receiving bore 8. As can furthermore be appreciated from FIG. 2, it is possible, thanks to the uniform pressure of the annular surface 22 against the end surface 6a, for the axial length of the cylindrical toolholder shank 17 to be kept relatively short. The axial length need only be approximately equal to the diameter of the said shank 17.

Preferably, all the insert disks 6 intended for use with a given rotary disk 4 are of the same external diameter. The individual insert disks, which are of the same external diameter, may, howeyer in some cases have shank-receiving bores 8' of relatively large diameter and in other cases have shank-receiving bores 8'' of relatively small diameter. It is thus possible for tool holders, which have shanks of larger or smaller diameter according to the particular operational task that is required to be performed, to be fitted into the insert disks directly and without the interposition of an adapter. For this purpose, the insert disks can be interchanged after loosening the fixing screws 7.

This interchangeability of the insert disks 6 is also of advantage when, due to a programming error or a tool breakage, an overload occurs and damage is thereby caused, for example, to the receiving bore 8. All the parts that are subject to wear, among which are included the clamping screws 11, 13, the clamping bolt 19 and also the insert disks 6, can easily be interchanged when required.

It is advisable that the distance of the axis A3 of each insert-receiving recess 5 from the circumferential surface 4b of the rotary disk 4 should be somewhat greater than the radius of the insert-receiving recess. Each insert disk 6 thus projects somewhat outside the circumferential surface 4b and consequently the clamping screws 13 are easily accessible. Moreover, the rotary disk 4 can be kept somewhat smaller in diameter so that its weight is reduced.

In addition, it is advantageous if each insert disk 6 has two recesses 26 in its circumference 6c at two positions respectively which are transverse to the axis A4 of the screw-threaded bores 9, 10. The rotary disk 4 is furthermore provided, in the region of each of the recesses 26, with a screw-threaded bore 27 which extends susbtantially radially with respect to the axis A2 of the rotary disk and in which an adjusting screw 28 engaging in the corresponding recess 26 is screwed. By means of the two adjusting screws 28, each insert disk 6 can be locked against rotation and can in addition be angularly adjusted. Morever, each insert disk can be clamped in the corresponding insert-receiving recess 5 by the two corresponding adjusting screws 28 so that it is free from play.

The embodiments of the invention in which an exclusive property or privilege is claimed are defined as follows:

1. In a turret head for a lathe and a tool holder for use therewith, including a substantially cylindrical rotary disk which is rotatable about its axis and has a plurality of tool holder shank-receiving bores formed close to its periphery, these shank-receiving bores being circumferentially spaced apart and extending parallel to the axis of the rotary disk and each of them being surrounded by an end surface disposed at right angles to the axis of the rotary disk and having an associated clamping element which extends into it and is movable radially with respect to the axis of the rotary disk, and also including tool holders each having a cylindrical shank which fits accurately in the shank-receiving bore, a concentric annular surface of the tool holder surrounding each shank and extending at right angles to the axis of the same, and clamping means on the shank cooperating with the clamping element in such a manner that the annular surface of the tool holder can be pressed against the end surface surrounding the corresponding shank-receiving bore when the clamping element is moved radially, the improvement comprising wherein the rotary disk (4) has a cylindrical insert-receiving recess (5) disposed concentrically with each shank-receiving bore (8), wherein for each insert-receiving recess (5) there is provided an insert disk (6) which is removably insertable therein and concentrically within which is located the respective shank-receiving bore (8), wherein each insert disk (6) has in the region of the shank-receiving bore (8) two diametrically opposite, radially extending screw-threaded bores (9, 10), an inner clamping screw (11) with a conical recess (12) being screwed into one of the screw-threaded bores (9) which is located more inwardly in relation to the axis (A2) of the rotary disk (4) and an outer clamping screw (13) with a conical end part (14) being screwed into the other screw-threaded bore (10) which is located more outwardly in relation to the said axis, wherein the shank (17) of each tool holder has a transverse bore (18) with a clamping bolt (19) arranged for radial sliding movement therein and provided at one of its ends with a conical end part (20) which cooperates with the conical recess (12) in the inner clamping screw (11) and is provided at its other end with a conical recess (21) which is arranged to cooperate with the conical end part (14) of the outer clamping screw (13) and wherein the distance (a1) of the axis (A4) of the screw-threaded bores (9, 10) from the end surface (6a) of the insert disk (6) is somewhat greater than the distance (a2) of the axis (A5) of the transverse bore (18) from the annular surface (22), so that, when the outer clamping screw (13) is tightened, it acts against the clamping bolt (19) in a direction to cause pressure of the annular surface (22) and the end surface (6a) of the insert disk against each other.

2. The turret head according to claim 1, wherein each insert-receiving recess (5) has a flat base surface (5a) located in a radial plane with respect to the axis (A2) of the rotary disk, against which radial plane the insert disk (6) abuts with its flat rear end surface (6b).

3. The turret head according to claim 1 wherein each insert disk (6) is disengageably connected with the rotary disk (4) by means of a plurality of fixing screws (7) which extend through it and are screwed into the base (5a) of the insert-receiving recess (5).

4. The turret head according to claim 1, wherein the outwardly facing front end surface (6a) of each insert disk (6) projects slightly beyond the end surface (4a) of the rotary disk (4).

5. The turret head according to claim 1, wherein all the insert disks (6) intended for any given rotary disk (4) are of the same diameter, but the receiving bores 8, 8', 8" therein are of different diameters.

6. The turret head according to claim 1, wherein each insert disk (6) has in its outer circumferential surface (6c) two recesses (26) located at two positions respectively which are lcoated transversely to the axis (A4) of the screw-threaded bores (9, 10), and wherein the rotary disk (4) is formed in the region of the recess (26) with a screw-threaded bore (27) extending substantially radially with respect to the axis (A2) of the rotary disk (4), in which bore (27) an adjusting screw (28) supported in the recess (26) is screwed.

7. The turret head according to claim 1, wherein the distance of the axis (A3) of the insert-receiving recess (6) from the circumferential surface (4b) of the rotary disk (4) is somewhat shorter than the radius of the insert-receiving recess (5).

* * * * *